United States Patent Office 3,793,415
Patented Feb. 19, 1974

3,793,415
INJECTION MOLDED RESIN ARTICLES HAVING A FOAMED RESIN CORE
Alan George Smith, Harrow, England, assignor to Imperial Chemical Industries Limited, London, England
Continuation-in-part of abandoned application Ser. No. 109,470, Jan. 25, 1971. This application Nov. 16, 1971, Ser. No. 199,152
Int. Cl. B29d 27/00; B29f 1/06
U.S. Cl. 264—45         6 Claims

ABSTRACT OF THE DISCLOSURE

Providing articles having a foamed core by injecting a foamable composition into a mould to fill the mould without foaming and retracting movable inserts in a mould wall or extending into a mould, either so as to allow areas of the moulding to foam or so that the space vacated by the inserts becomes filled without the moulding foaming, and then enlarging the volume of the mould cavity to allow the core of the moulding to foam.

---

This application is a continuation-in-part application of Ser. No. 109,470 filed Jan. 25, 1971 and now abandoned.

The present invention relates to an injection moulding process for the production of articles having a foamed core.

It has already been proposed that moulded panels may be reinforced by foaming a rib pattern on one side of the panel. These panels have, however, been made in a mould which has recesses corresponding to the required rib pattern already formed in the mould walls. If injection moulding techniques are used the molten polymeric material that is injected into the mould will flow in an irregular fashion through the rib pattern recesses which results in imperfections in the non-ribbed side of the moulding.

It has also been proposed that moulded laminar articles having a foamed core substantially totally surrounded by an unfoamed surface skin may be formed by injection moulding. Such articles are produced by first injecting an unfoamable resin into an injection mould and before the central portion of the unfoamable resin has set, injecting a foamable resin into the mould cavity to within the first unfoamable material and maintaining the composition within the mould for sufficient time to allow the foamable composition to foam and the unfoamable and foamable resins to set. In this process it is difficult to control the positions of the core which are foamed within the skin apart from varying the quantities of the materials which are injected and varying the position of the sprue of the mould. It may be desirable, however, to produce an article, part of which has a core that is foamed to a certain extent while another part has a core that is foamed to a greater extent.

The present invention is directed towards providing an injection moulding process which, inter alia, will provide mouldings having ribs on one face thereof, which mouldings have an improved surface on the non-ribbed face, i.e. the show face, and also to mouldings having foam cores that are foamed to a greater extent in selected portions than other portions.

According to the present invention I provide a process for the production of foam core mouldings comprising injecting a foamable injection mouldable resinous polymeric material containing a blowing agent into a mould cavity defined by mould members that are relatively slidably movable away from each other so as to enlarge the mould cavity, at least one of the mould members having at least one insert slidably mounted therein whereby, on retraction of said at least one insert with respect to the mould member in which it is slidably mounted, the mould cavity is locally enlarged, said polymeric material being injected in a fluid state at a temperature at which the blowing agent normally generates gas to cause foaming but under such pressure that the mould cavity is filled without foaming of the polymeric material occurring, retracting said at least one insert with respect to the mould member in which it is slidably mounted while at least the interior of said injected polymeric material is still fluid so as to locally enlarge the mould cavity thereby allowing the polymeric material to locally foam and, thereafter, while maintaining the at least one insert in the retracted position relative to the mould member in which it is slidably mounted and while at least the interior of said injected polymeric material is still fluid, moving said mould members apart relative to one another so as to enlarge the mould cavity thereby allowing more of the resinous material to foam. As a modification to the process a further quantity of the foamable polymeric material is injected simultaneously with the retraction of the at least one insert so that the locally enlarged mould cavity is filled with the unfoamed foamable polymeric material so that foaming only occurs on moving the mould members apart.

It will be appreciated that in some cases it may be desirable to inject insufficient additional foamable material to fill the locally enlarged cavity created by retraction of the at least one insert so that the skin is forced to extend to occupy the space vacated by the at least one insert partly by injection of the additional material and partly by foaming of the foamable material. In this way the density of parts of the final moulding can be adjusted.

The mould cavity is defined by mould members that are slidably movable apart with respect to one another so that the mould cavity can be enlarged. Such moulds are well known in the art as "vertical flash" moulds.

The retractable insert is slidably mounted in one of the mould members and, in the non-retracted position, may have its end face protruding beyond the moulding surface of the mould member, i.e. protruding into the mould cavity, or may have its end face flush with the moulding surface of the mould member or indeed its end face may be set back from the moulding surface of the mould member. Where it is desired to form a rib on a moulding I prefer that the end face of the retractable insert is flush, when in the non-retracted position, with the moulding surface of the mould member in which it is slidably mounted. More than one retractable insert may be used and inserts may be mounted in more than one of the mould members. Where it is desired to produce panels having a smooth front surface reinforced with ribs on its reverse side, all the inserts will be formed in the same mould member. A grid system of ribs may readily be formed by the process of the present invention if the inserts are suitably positioned in the mould. The techniques of the present invention in such cases have advantages as compared with producing moulds which are shaped to provide a ribbed pattern because when a melt is injected into a mould cavity which is machined to produce a grid pattern on the moulding, the melt flows irregularly in the grids giving rise to melt faults on the show face of the moulding. The technique of the present invention overcomes this problem and allows the melt to flow into the grids in a regular manner. The position of the movable inserts in the mould is determined by the pattern it is required to impart to the reverse side of the moulding.

Where it is desired to produce articles such as a tennis racquet or a unit shoe sole where it may be desirable to have one part of the article, e.g. the frame of the racquet or the sole of the unit shoe sole, foamed to only a small extent while the rest of the article, e.g. the handle of the racquet or the heel of the unit sole, has a core foamed to a greater extent, a suitably shaped insert is arranged to project into the portion of the mould cavity corresponding to the part of the article that is to be foamed to a greater extent and on retraction of the insert after injection of the foamable material, the foamable material foams into the space vacated by the retracting insert. On subsequent enlargement of the mould cavity by moving the mould members apart, the foamable material foams throughout the article but as part of the material has foamed into the space vacated by the retractable insert, the degree of foaming in the region vacated by the insert will be greater than that elsewhere in the moulding.

It will be appreciated that the foam density in various parts of the article will be determined by a variety of interrelated factors including the proportions of foamable and unfoamable materials injected (if unfoamable material is injected as hereinafter described), the initial and final cavity dimensions at the respective parts of the moulding, the position of the insert, or inserts, the amount by which the cavity is enlarged by retraction of the insert or inserts, and the amount, if any, of additional foamable material injected. It will thus be appreciated that by varying these factors articles can be made with the foam density uniform to a greater or lesser extent throughout the article.

The retraction of the inserts may be brought about by moving cams or wedges which are actuated when the mould is filled during the moulding cycle. Such actuating mechanisms can be used to reset the inserts in their original position at the end of the moulding cycle. If required, the resetting action can also be used as a means whereby the moulding is ejected from the mould.

Alternatively the inserts may be held in the non-retracted position against stops by fluid, e.g. hydraulic, pressure and the inserts are permitted to move by relaxing this fluid pressure so that the injection of the additional foamable material or the foaming of the foamable material, where no additional foamable material is injected, forces the inserts to retract.

Resinous polymeric materials that may be used in the present invention are those which can be injected into a mould cavity while in the state of a viscous liquid and which can thereafter be caused to solidify in the mould cavity. Thus thermoplastic polymeric resinous materials may be used which can be injected in the form of viscous melts and allowed to solidify in the mould cavity by cooling. Alternatively thermosetting polymeric resinous materials may be used which can be injected into the mould cavity in the state of a viscous liquid and then caused to solidify by effecting cross-linking while in the cavity. Generally the thermosetting resinous materials are cross-linked by heating.

Examples of suitable injection mouldable thermoplastic resins which may be used include polymers and copolymers of α-olefines, such as high and low density polyethylene, polypropylene, polybutene, poly-4-methyl pentene-1, propylene/ethylene copolymers, copolymers of 4-methyl pentene-1 with linear α-olefines containing 4 to 18 carbon atoms, and ethylene/vinyl acetate copolymers; polymers and copolymers of vinyl chloride, vinyl acetate, vinyl butyral, styrene, substituted styrenes such as α-methyl styrene, acrylonitrile, butadiene, methyl methacrylate, vinylidene chloride. Specific examples of such polymers include vinyl chloride homopolymers and copolymers of vinyl chloride with vinyl acetate, propylene, ethylene, vinylidene chloride, alkyl acrylates such as 2-ethyl hexyl acrylate, alkyl fumarates, alkyl vinyl ethers, such as cetyl vinyl ether, and N-aryl maleimides such as N-o-chlorophenyl maleimide; polyvinyl acetate, polyvinyl butyral; polystyrene, styrene/acrylonitrile copolymers; polyacrylonitrile; copolymers of butadiene with methyl methacrylate and/or styrene and optionally acrylonitrile; polymethyl methacrylate; copolymers of methyl methacrylate with minor amounts of alkyl acrylate such as methyl acrylate, ethyl acrylate and butyl acrylate; copolymers of methyl methacrylate, N-aryl maleimides and optionally styrene; and vinylidene chloride/acrylonitrile copolymers, melt processable copolymers of tetrafluoroethylene and hexafluoropropylene.

Halogenated polymers or copolymers may be used; for example halogenated α-olefine polymers, such as chlorinated polyethylene, or halogenated vinyl chloride polymers, such as chlorinated polyvinyl chloride.

Other injection mouldable thermoplastic polymers that may be used include condensation polymers such as the injection moulding grades of linear polyesters such as polyethylene terephthalate; polyamides such as polycaprolactam, polyhexamethylene adipamides and copolyamides such as copolymers of hexamethylene diamine adipate and hexamethylene diamine isophthalate, particularly those containing from 5 to 15% by weight of hexamethylene diamine isophthalate; polysulphones and copolysulphones; polyphenylene oxides; polycarbonates, thermoplastic polymers and copolymers of formaldehyde; thermoplastic linear polyurethanes; and the thermoplastic derivatives of cellulose such as cellulose acetate, cellulose nitrate and cellulose butyrate and mixed cellulosic esters, for example cellulose acetate butyrate.

Where a copolymer is used, the amounts of the comonomers that are used in the copolymer will depend, inter alia, on the properties required of the moulding.

Thermosetting resins include plastics materials that either undergo cross-linking of their own accord or in the presence of a hardener or catalyst when heated to a sufficiently high temperature. Thus the term includes a material falling within the commonly understood ambit of the term "thermosetting," and also a plastics material which is normally thermoplastic but contains a cross-linking agent such as a peroxide which causes cross-linking when the plastic is heated to a sufficiently high temperature.

Examples of suitable thermosetting resins that may be used include phenol-aldehyde resins, amineformaldehyde resins, epoxy resins, polyester resins, thermosetting polyurethanes, and vulcanizable rubbers.

The resins may contain a hardening agent or catalyst where this is necessary to enable the resin to set.

Injection mouldable cross-linkable thermoplastics include copolymers of methyl methacrylate and glycol dimethacrylate and ethylene/vinyl acetate copolymers containing a cross-linking agent.

Blends of resinous polymeric materials may be used.

The process of the present invention is particularly applicable to the production of laminar articles having a sandwich construction of a core of foamed polymeric resinous material substantially surrounded by a skin of polymeric resinous material which is free of blowing agent. Such articles may readily be prepared by an injection moulding process in which a charge of an unfoamable material is injected into a mould and subsequently injecting a charge of material containing a blowing agent to within the charge of unfoamable material that is aleady in the mould.

In this preferred process, I have found that by first injecting an unfoamable thermoplastic resin into the mould cavity, the tendency for voids to be formed in the surface of the article due to the presence of the blowing agent in the surface layer is overcome. Furthermore, the presence of the gas pressure inside the moulding due to the decomposition of the blowing agent balances the tendency of the moulding to shrink as it cools down in the mould, thus overcoming the surface blemishes which often occur in the production of solid mouldings, particularly at the thicker parts of the moulding.

Where this preferred process is adopted, the foamable material may be the same as the unfoamable material with the addition of the blowing agent.

Alternatively the plastics may be quite different and also may contain different additives.

In addition, if the foamable and the unfoamable materials are obtained from separate sources, this preferred process has the added advantage that, if any pigments, fillers or other additives which improve the surface finish of the articles are to be included in the moulding, they need only be included in the unfoamable resin. For example, additives which improve the resistance of the article to moisture or light, such as ultra-violet light stabilizers need only be included in the unfoamable resin. This may result in considerable financial saving as smaller amounts of these additives or compositions containing them may be used and many of these additives are expensive. Examples of fillers which may be included to improve the stiffness of the moulding include glass fibres, asbestos fibres, glass plates and mica plates optionally coated with a resin to improve adhesion between the filler and the thermoplastic. If desired, different additives may be included in the foamable and unfoamable materials. Additives that may be etched to improve the adhesive properties of the surface may be included in the unfoamable material, for example, titanium dioxide may be included and may subsequently be etched out with chromic acid.

The choice of the resin will depend upon the use to which the article is to be put, for example, if a stiff panel is required to form, for example, part of the body of a motor car then a stiff outer skin is required and polypropylene is a suitable resin. However, if a flexible moulding is required, for example, for the interior trim of a motor car then a plasticized vinyl chloride polymer will be eminently suitable as the unfoamable thermoplastic resin.

The foamable material contains a blowing agent that evolves a gas on heating above a certain temperature, herein termed the activation temperature, e.g. by volatilization (when the pressure on the composition is reduced or by decomposition). The blowing agent may be solids or liquids which decompose on heating or may be liquids which when heated and the pressure on the composition is reduced, vaporize. The liquids which vaporize on heating are preferably organic liquids which are inert to and may be absorbed by the resinous polymeric material. The gas liberated by the decomposable type of blowing agent should preferably be inert to the resinous polymeric material. The temperature at which the foamable material should be injected into the mould cavity in our process is determined by the nature of the blowing agent. For example, if the blowing agent is a solid that liberates a gas on heating, the temperature of the resinous polymeric material as it leaves the nozzle should be above the temperature, i.e. the activation temperature, at which the gas is liberated. If, however, the blowing agent is a liquid which vaporizes on heating, the conditions under which the gas is liberated will depend on both the temperature of the resinous polymeric material and the pressure to which it is subjected; in this situation the temperature of the resinous polymeric material as it leaves the nozzle should be sufficiently high that gas bubbles and foam is formed when the pressure on material in the mould cavity is relieved when the cavity is enlarged. The resinous polymeric material may be brought to this temperature above the activation temperature either by heating it to the required temperature as it passes along the barrel of the injection moulding machine, although the pressure inside the barrel should be sufficiently high to prevent foaming, or by maintaining the temperature in the barrel below the activation temperature and relying on dynamic heating of the material as it is ejected through the nozzle to raise it to above the activation temperature. This second method is my preferred method. Examples of suitable liquid blowing agents include hydrocarbons such as pentane and the halo- and polyhalo-hydrocarbons; examples of suitable solid blowing agents include the nitrogen liberating blowing agents, for example the azo and hydrazo compounds, and also the carbon dioxide liberating blowing agents for example carbonates and bicarbonates. It is also possible to use gases as the blowing agent. Examples of suitable gases which may be used as blowing agents include nitrogen and carbon dioxide. In some instances it may be necessary to include a nucleating agent in the foamable material to provide sites for bubble formation.

The amount of foamable material injected and the pressure under which it is injected into the mould cavity is such that the cavity (before local enlargement thereof) is filled before foaming occurs.

This may be achieved by using standard injection moulding conditions. The resinous polymeric material is preferably injected at a temperature within the range 140° C. to 300° C. and a pressure equal to or less than 1400 bars. When an unfoamable material is injected before the foamable material the amounts of the two materials injected should be such that the mould cavity (before local enlargement thereof) is filled without any foaming taking place.

The mould members may be moved apart, after retraction of the insert or inserts, by instantaneously relieving the pressure holding opposed mould members together and allowing the gas pressure generated by the blowing agent to force the mould members apart thus enlarging the mould cavity and allowing the foamable composition to expand to fill the enlarged mould cavity. Alternatively the pressure holding opposed mould members together may be reduced slowly thus allowing a controlled enlargement of the mould cavity. The enlargement of the mould may be effected entirely by the pressure of the gases generated by the blowing agent or external forces may be applied to help enlarge the mould cavity.

The mould may be cooled to enhance the setting of the materials adjacent to the mould. The temperature chosen will depend upon the nature of the resinous material; for example I prefer to use mould temperatures of from 30° C. to 70° C. when moulding articles from vinyl chloride polymers and from 30° C. to 50° C. when moulding articles from polyolefines.

The process of the present invention enables mouldings having improved surface finish to be produced as the resinous polymeric material is injected to fill the mould under full injection pressure thus ensuring good mould definition. The pressure generated by the gases produced by the blowing agent urges the material against the walls of the mould and this ensures good mould definition if the mould is enlarged to allow foaming.

The process of the present invention may be used to produce rigid building panels with good surface finish and improved rigidity due to a rib pattern on the reverse side thereof. The process may also be used in the production of flexible mouldings such as soft cushioned seat pads or chair arm rests where integrally moulded flexible ribs provide an additional cushioning effect. The process may also be used to foam selected areas of a moulding to a greater extent than other areas so as to selectively thicken sections of the moulding. This is particularly useful in the production of interior trim panels for vehicles where the technique allows the moulding to be selectively foamed to conform to a selected contour.

The present invention is illustrated but in no way limited by reference to the accompanying drawings in which.

Figure 1:
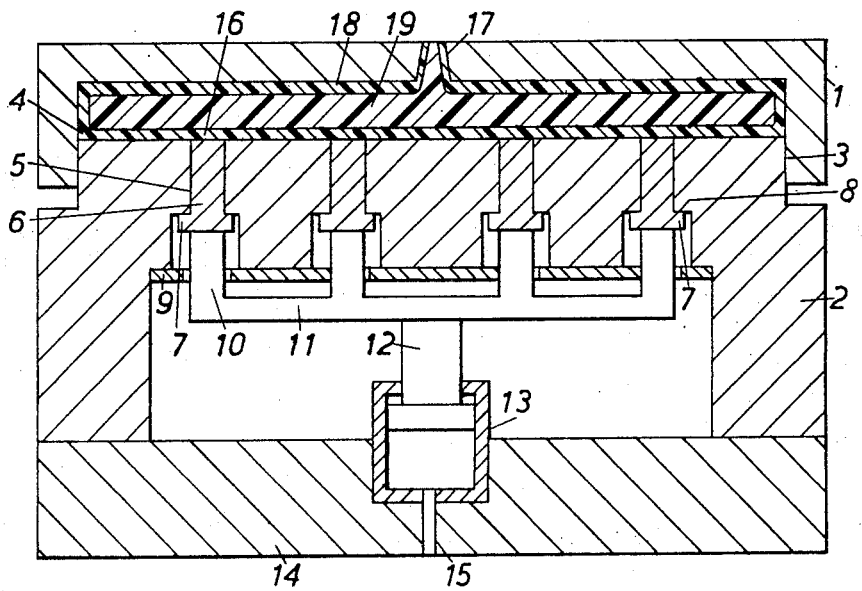
FIGS. 1 to 3 are schematic side elevational sections through a mould for the production of ribbed mouldings at various stages in a moulding cycle.
Figure 2:
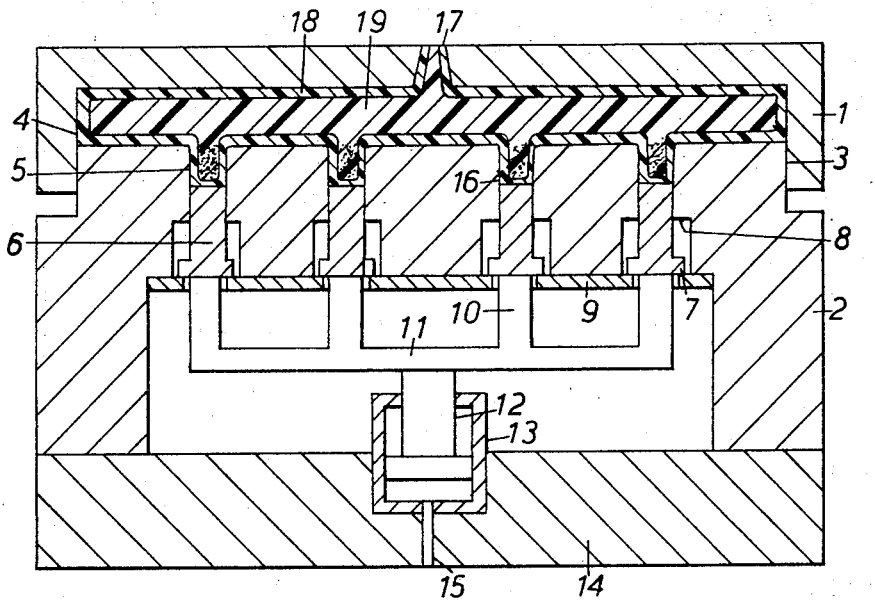
Figure 3:
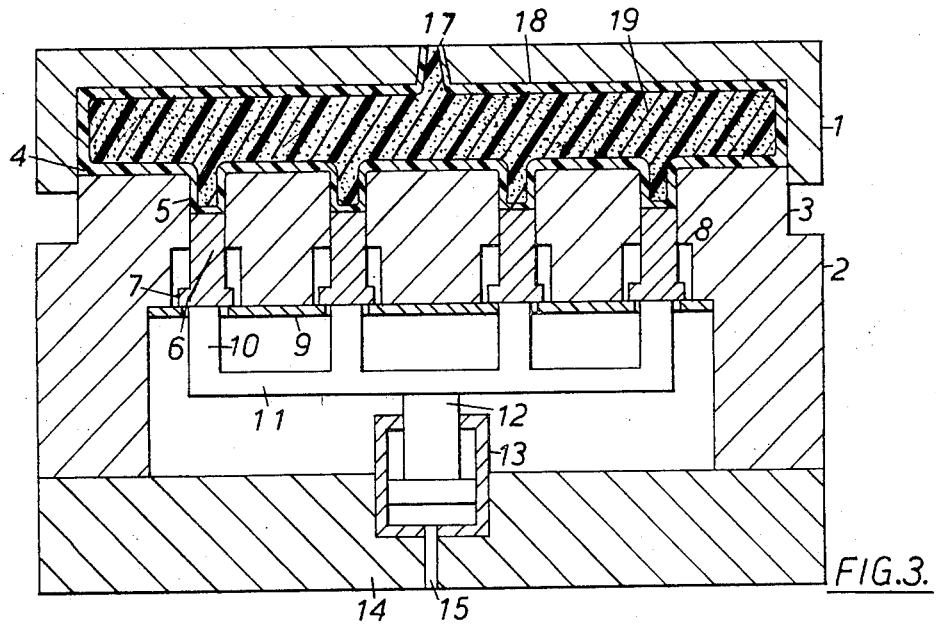

In FIGS. 1 to 3 a panel mould is shown defined by two mould members 1, 2 constituting a vertical flash mould. The mould members can slide apart along their mating faces 3 so as to enlarge the mould cavity.

The moulding surface 4 of mould member 2 has a series of longitudinally extending recesses 5 corresponding to the desired ribs. In these recesses 5 are slidably located inserts 6, the movement of which is limited by an enlarged head portion 7 which can abut against stops 8 formed on the outer end of recesses 5. Movement of the inserts is also limited in the other direction by the head portion 7 abutting against a plate 9 fastened to mould member 2. Acting on the head portion 7 of the inserts is a series of cylindrical members 10 extending through plate 9 and connected together by a bar 11 which can be urged towards plate 9 by a ram 12 hydraulically operable by a hydraulic cylinder 13 mounted in a backing member 14 fastened to mould member 2. Hydraulic fluid can be admitted to, or released from cylinder 13 via a pipe 15.

Initially, the inserts 6 are held in the non-retracted position with their head portion abutting against stops 8 by hydraulic pressure applied by ram 12 from cylinder 13. In this position the ends 16 of the inserts 6 are flush with the remainder of the moulding surface 4 of mould member 2. The mould member 2 is held against mould member 1 by a conventional hydraulic clamping system (not shown) so that the cavity is in the non-enlarged position.

An unfoamable resinous material, such as polypropylene containing no blowing agent, is injected into the mould cavity as a melt via a sprue channel 17 in mould member 1. Then a foamable composition, such as polypropylene containing azodicarbonamide as a blowing agent is injected as a melt, at a temperature above the decomposition temperature of the azodicarbonamide, into the interior of the unfoamable material via sprue channel 17. The foamable material extends the unfoamable material to the walls of the mould cavity to form an unfoamed skin 18 enclosing the core 19 of the foamable material (see FIG. 1). The amounts of the unfoamable and foamable materials injected are such that the mould cavity is filled without foaming of the foamable material taking place. The foamable material is injected at standard injection moulding injection pressures and rates which are sufficient to ensure that no foaming occurs during filling of the mould cavity.

Hydraulic fluid is then released from cylinder 13 thereby reducing the pressure exerted by ram 12 on the inserts 6 thus allowing the inserts to retract into recesses 5, thereby locally enlarging the mould cavity. At the same time more foamable material is injected through sprue channel 17 so that sufficient pressure is maintained on the foamable core 19 to prevent it from foaming as it extends the skin 18 into the spaces vacated by retraction of inserts 6. When the head portions 7 of the inserts 6 abut against plate 9, injection of the foamable material is stopped—see FIG. 2. Then the clamping force holding mould members 1 and 2 together is relaxed, allowing the mould members to move apart, with the retracted inserts kept in the retracted position, thereby enlarging the mould cavity under the pressure generated by the blowing agent so that the foamable core 19 can foam—see FIG. 3. The moulding is then cooled to solidify the resinous materials, the mould opened and the moulding removed.

Figure 4:
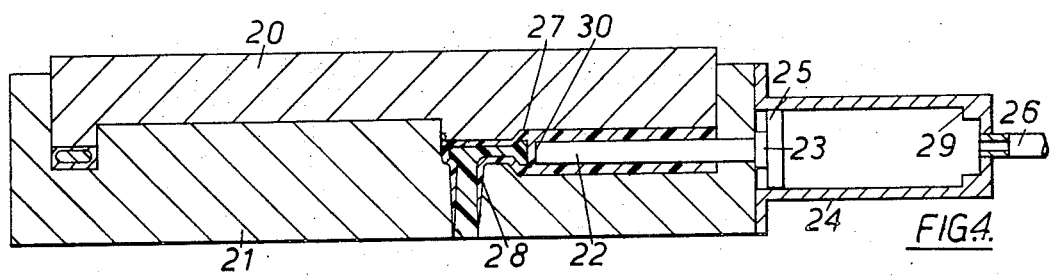
FIGS. 4 to 6 are schematic side elevational sections through a mould for the production of a tennis racquet at various stages in the moulding cycle.
Figure 5:
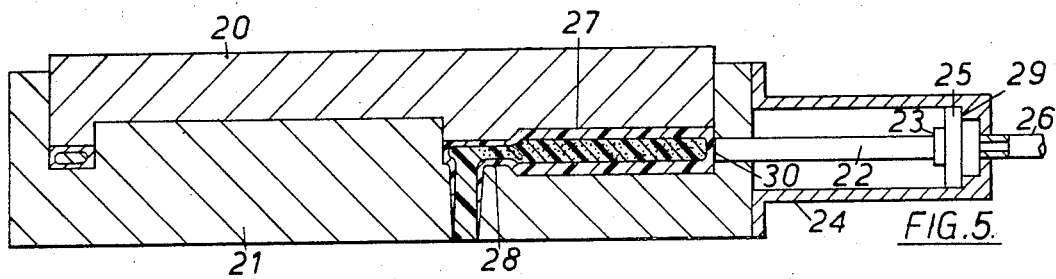
Figure 6:
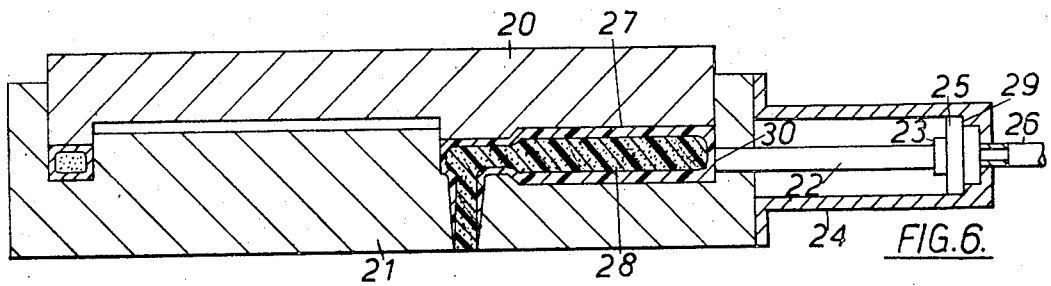

In the system shown in FIGS. 4 to 6, the mould cavity, in the shape of a tennis racquet, is defined by relatively movable vertical flash mould members 20, 21. A retractable cylindrical insert 22 extends into the handle portion of the mould cavity. This insert 22 is held in the non-retracted position, wherein stop 23 abuts against the side of mould member 21 by hydraulic fluid pressure applied in cylinder 24 to ram 25 via pipe 26. As in the system depicted in FIGS. 1 to 3, the mould cavity is first filled with a skin 27 of unfoamable material enclosing a core 28 of unfoamed, but foamable material—see FIG. 4. The hydraulic pressure on ram 25 is thne reduced by releasing fluid from cylinder 24 via pipe 26, but, instead of injecting more foamable material as in the system of FIGS. 1 to 3, the insert 22 is forced to retract, thereby locally enlarging the mould cavity, until prevented by ram 25 abutting with a stop 29, by foaming of the core 28 in the handle region forcing the skin 27 against the end 30 of insert 22. In the retracted position, see FIG. 5, the end 30 of the insert 22 is flush with the end wall 31 of the mould member 21.

The clamping pressure holding mould members 20 and 21 together is then relaxed, allowing the mould members 20 and 21 to move apart slightly thus enlarging the mould cavity at the same time permitting the core material to foam throughout the moulding.

I claim:

1. A process for the production of foam core mouldings comprising injecting a foamable injection mouldable resinous polymeric material containing a blowing agent into a mould cavity defined by mould members that are relatively slidably movable away from each other so as to enlarge the mould cavity, at least one of the mould members having at least one insert slidably mounted therein whereby, on retraction of said at least one insert with respect to the mould member in which it is slidably mounted, the mould cavity is locally enlarged, said polymeric material being injected in a fluid state at a temperature at which the blowing agent normally generates gas to cause foaming but under such pressure that the mould cavity is filled without foaming of the polymeric material occurring, retracting said at least one insert with respect to the mould member in which it is slidably mounted while at least the interior of said injected polymeric material is still fluid, so as to locally enlarge the mould cavity thereby allowing the polymeric material to locally foam and, thereafter, while maintaining the at least one insert in the retracted position relative to the mould member in which it is slidably mounted and while at least the interior of said injected polymeric material is still fluid, moving said mould members apart relative to one another so as to enlarge the mould cavity thereby allowing more of the resinous material to foam.

2. A process as claimed in claim 1 comprising injecting an additional amount of the foamable material as the at least one insert is retracted, the amount of additional foamable material being insufficient to fill the locally enlarged mould cavity whereby the space vacated by the retraction of the insert is filled partially by foamable material displaced into said space by the injection of the additional foamable material injected and partially by local foaming of the foamable material.

3. A process as claimed in claim 1 comprising injecting, in a fluid state, an unfoamable injection mouldable resinous polymeric material into the mould cavity before injecting the foamable material and injecting the foamable material to within the unfoamable material whereby the unfoamable material is extended as an enveloping skin on injection of the foamable material to fill the mould cavity.

4. A process for the production of foam core mouldings comprising injecting a foamable injection mouldable resinous polymeric material containing a blowing agent into a mould cavity defined by mould members that are relatively slidably movable away from each other so as to enlarge the mould cavity, at least one of the mould members having at least one insert slidably mounted therein whereby, on retraction of said at least one insert with respect to the mould member in which it is slidably mounted, the mould cavity is locally enlarged, said polymeric material being injected in a fluid state at a temperature at which the blowing agent normally generates gas to cause foaming but under such pressure that the mould cavity is filled without foaming of the polymeric material occurring, retracting said at least one insert with respect to the mould member in which it is slidably mounted while at least the interior of said injected polymeric material is still fluid so as to locally enlarge the mould cavity and simultaneously injecting a further quantity of said foamable polymeric material whereby the locally enlarged mould cavity is filled with the unfoamed foamable polymeric material and, thereafter while maintaining the at least one insert in the retracted position relative to the mould member in which it is slidably mounted and while at least the interior of said injected polymeric material is still fluid, moving said mould members apart realtive to one another so as to enlarge the mould cavity thereby allowing the resinous material to foam.

5. A process as claimed in claim 4 comprising injecting, in a fluid state, an unfoamable injection mouldable resinous polymeric material into the mould cavity before injecting the foamable material and injecting the foamable material to within the unfoamable material whereby the unfoamable material is extended as an enveloping skin on injection of the foamable material to fill the mould cavity.

6. A process according to claim 1 for the production of a foam cored panel reinforced with a pattern of ribs on one face thereof wherein when the at least one insert is in the nonretracted position its end lies flush with the moulding surface of the mould member in which said at least one insert is mounted and the moulding surfaces of the mould members together with the flush end of the insert define a mould cavity in the shape of an unribbed panel and when the at least one insert is in the retracted position and the mould members are moved apart to define the enlarged mould cavity the moulding surfaces of the mould members and the end of the retracted at least one insert define the cavity for the ribbed panel.

References Cited
UNITED STATES PATENTS

| | | | |
|---|---|---|---|
| 2,530,289 | 11/1950 | Cook | 264—54 |
| 3,058,161 | 10/1962 | Beyer et al. | 264—DIG. 83 |
| 3,264,381 | 8/1966 | Stevens | 264—55 XR |
| 3,669,598 | 6/1972 | Tucker | 264—328 XR |
| 3,697,204 | 10/1972 | Kyritsis et al. | 264—DIG. 83 |
| 3,466,700 | 9/1969 | Harrison | 264—328 XR |
| 3,599,290 | 8/1971 | Garner | 264—328 X |
| 3,384,691 | 5/1968 | Weissman | 264—47 |
| 3,249,660 | 5/1966 | King | 264—328 X |
| 3,211,605 | 10/1965 | Spaak | 264—328 X |
| 3,531,553 | 9/1970 | Bodkins | 264—328 X |
| 3,558,751 | 1/1971 | Santelli | 264—45 |
| 3,029,472 | 4/1962 | Fischer | 264—DIG. 13 |
| 3,378,612 | 4/1968 | Dietz | 264—DIG. 83 |
| 3,694,529 | 9/1972 | Josephsen et al. | 264—55 XR |

FOREIGN PATENTS 1,176,813   1/1970   Great Britain __ 264—DIG. 83

OTHER REFERENCES

Sandiford, Def. Pub. Search Copy of Ser. No. 869,859 filed Oct. 27, 1969, published in 883/0.6.9 on Feb. 2, 1971. Def. Pub. *T883,004.

PHILIP E. ANDERSON, Primary Examiner

U.S. Cl. X.R.

260—2.5 E; 264—51, 52, 55, 255, 328, DIG. 16, DIG. 17, DIG. 82, DIG. 83; 425—249, 817

UNITED STATES PATENT OFFICE
CERTIFICATE OF CORRECTION

Patent No. 3,793,415        Dated February 19, 1974

Inventor(s) ALAN GEORGE SMITH

It is certified that error appears in the above-identified patent and that said Letters Patent are hereby corrected as shown below:

Please add the following to the front page format after the serial number:

--Claims priority, application Great Britain, February 4, 1970, 5379/70--

Signed and sealed this 17th day of September 1974.

(SEAL)
Attest:

McCOY M. GIBSON JR.
Attesting Officer

C. MARSHALL DANN
Commissioner of Patents